(12) United States Patent
Williams, Jr.

(10) Patent No.: US 7,195,268 B1
(45) Date of Patent: Mar. 27, 2007

(54) PIVOTING HITCH MOUNT ASSEMBLY

(76) Inventor: Thomas M. Williams, Jr., 2310 Old Oxford Rd., Durham, NC (US) 27704

( * ) Notice: Subject to any disclaimer, the term of this patent is extended or adjusted under 35 U.S.C. 154(b) by 0 days.

(21) Appl. No.: 11/161,602

(22) Filed: Aug. 9, 2005

Related U.S. Application Data

(60) Provisional application No. 60/601,014, filed on Aug. 12, 2004.

(51) Int. Cl.
*B60D 1/46* (2006.01)
(52) U.S. Cl. ............... 280/490.1; 280/405.1; 280/467
(58) Field of Classification Search ............ 280/490.1, 280/467, 405.1, 515
See application file for complete search history.

(56) References Cited

U.S. PATENT DOCUMENTS

| | | | | |
|---|---|---|---|---|
| 2,625,089 A | * | 1/1953 | Pursche | 172/206 |
| 3,843,163 A | * | 10/1974 | Hale | 280/490.1 |
| 4,391,562 A | * | 7/1983 | Hetzner | 414/483 |
| 4,993,910 A | * | 2/1991 | Rigg | 414/563 |
| 5,011,176 A | * | 4/1991 | Eppinette | 280/479.3 |
| 5,934,698 A | * | 8/1999 | Despain | 280/490.1 |
| 7,029,022 B2 | * | 4/2006 | Moss | 280/491.3 |

* cited by examiner

*Primary Examiner*—Lesley D. Morris
*Assistant Examiner*—Marc A. Scharich
(74) *Attorney, Agent, or Firm*—Mills Law Firm PLLC

(57) ABSTRACT

A pivoting hitch mount assembly for interconnecting a towed vehicle with towing vehicles having hitch positions at varying elevations includes a pivot arm assembly having a hitching component for coupling with a the hitch position with the towing vehicle that is selectively connected to a support assembly on the towing vehicle at plural front and rear pivot connections enabling selective inclination and elevation of the hitching component with respect to the towing vehicle.

11 Claims, 8 Drawing Sheets

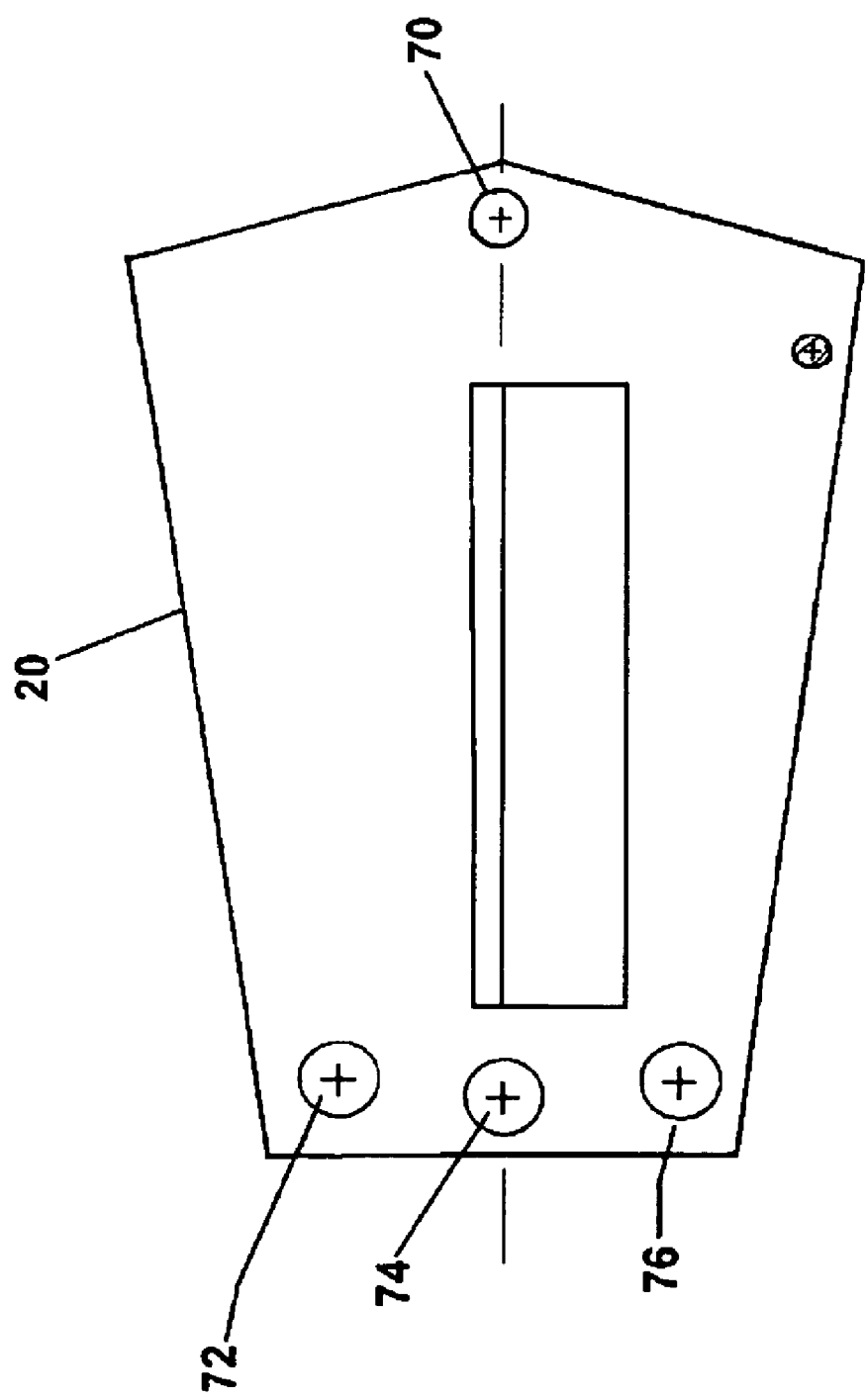

PIVOTING HITCH MOUNT ASSEMBLY

RELATED APPLICATION

This application claims the benefit of U.S. Provisional Application 60/601,014 filed on Aug. 12, 2004.

FIELD OF THE INVENTION

The present invention relates to vehicle coupling apparatus and, in particular, to a pivoting hitch mount assembly for operatively connecting towing and towed vehicles having hitch connections of differing elevations.

BACKGROUND OF THE INVENTION

Powered and trailed vehicles are conventionally interconnected for travel by coupling hitches involving fixed locations on the vehicles. Normally, the difference in elevation of the hitch components is not substantial, and the hitches can accommodate any angularity therebetween. In certain applications, primarily military, where versatility in connecting a wide range of towing and towed vehicle sizes is required, substantial elevational differences can exist that can adversely affect the towing characteristics therebetween.

SUMMARY OF THE INVENTION

The present invention provides a pivoting hitch mount assembly for accommodating a wide range of height variations between the vehicles. A pivoting hitch mount assembly is provided wherein a pivot arm assembly is connected to a support assembly at a front and rear pivot points that yield a range of fixed elevations and inclinations. The pivot arm includes vertically spaced pin connectors at the front end and a vertically centered pin connector at the rear end. The support assembly includes front transverse holes that can be aligned with either front pin connector for receiving a pivot pin to establish a front mount connection. The support assembly includes a plurality of rear transverse holes located at a constant radius from the front holes that is the same as the distance between the axes of the rear and front connectors. Accordingly a rear pin connection can be established at each of the rear hole sets providing a series of inclinations for each of the top or bottom connectors. The plural front and rear pivot combinations results in a longitudinally compact unit for providing a wide range of upward and downward inclinations and elevations of the pivot arm to accommodate variations in the hitch component elevations between the vehicles.

Accordingly, it is an object of the present invention to provide a coupling apparatus for accommodating variations in the elevations of hitch components between vehicles.

Another object is to provide a pivoting hitch assembly that is compact and can handle substantial elevation differences between vehicles.

A further object is to provide a hitch assembly having a plurality of adjustable connections for establishing varying fixed elevations of a hitch component.

DESCRIPTION OF THE DRAWINGS

The above and other features and advantages of the invention will become apparent upon reading the following written description taken in conjunction with the accompanying drawings in which:

FIG. 9 is a side elevational view of the pivot support assembly.

DESCRIPTION OF THE PREFERRED EMBODIMENTS

Figure 1:
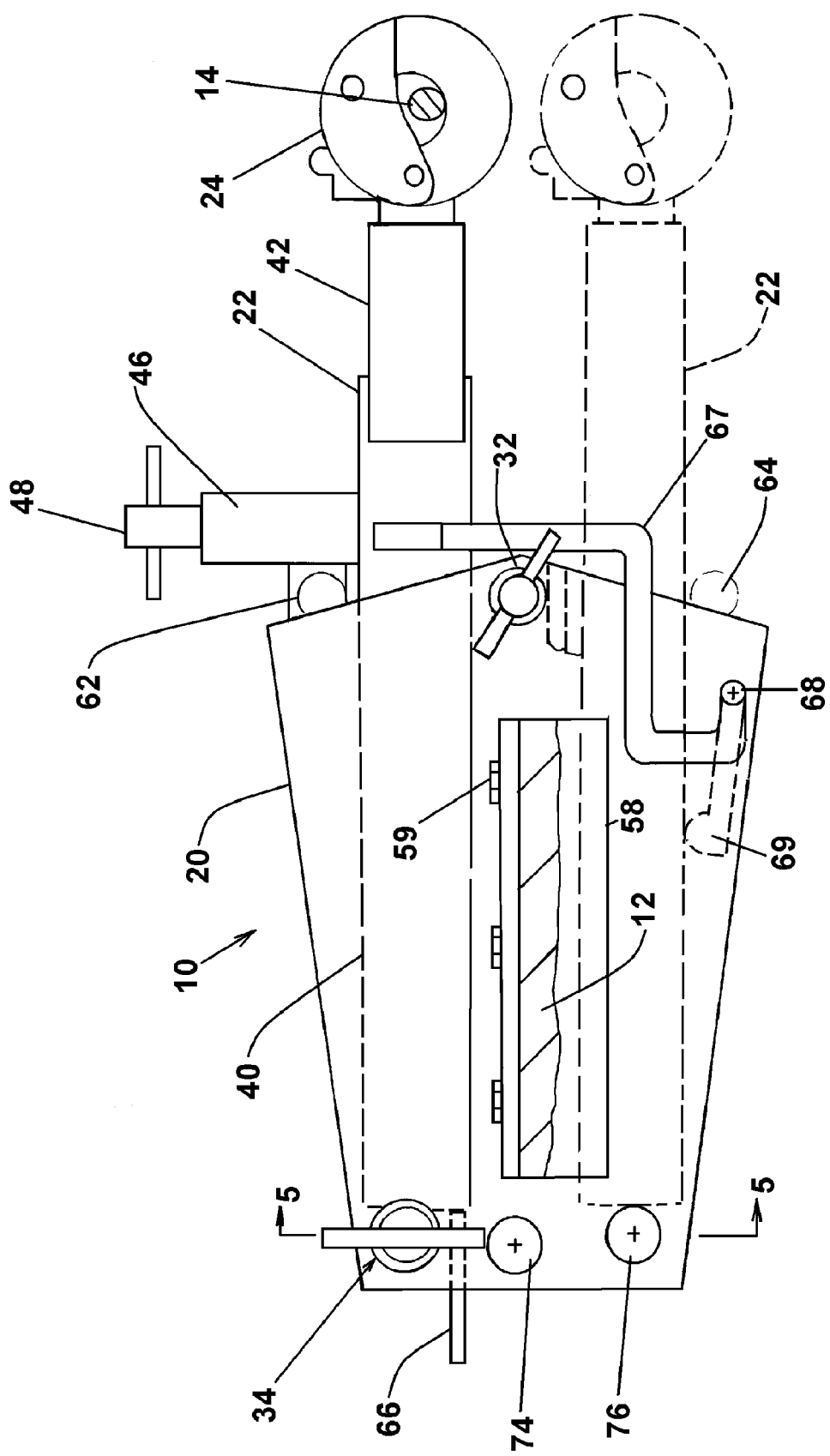
FIG. 1 is a side elevational view of the pivoting hitch mount assembly mounted on a vehicle and showing the hitch in solid lines at an upper position, and in dashed lines at a lower position.

Referring to FIG. 1, there is shown a pivoting hitch mount assembly 10 for interconnecting a towing vehicle with a towed vehicle. The mount assembly may be connected to either vehicle and for purposes of the present embodiment is shown mounted on the tongue 12 of the towed vehicle and operatively engaging the tow hook 14 of the towing vehicle. As described below, the mount assembly 10 may be selectively oriented to provide connection with varying elevations of the tow hook 14 while substantially maintaining the horizontal orientation of the towed vehicle.

The mount assembly 10 includes a pivot support assembly 20 and a pivot arm 22 frontally terminating with a hitching eyelet 24 or other suitable hitching component for conventional coupling with the hook 14 or compatible hitching component. The pivot arm 22 may be a solid or welded member and has generally rectangular vertical and horizontal cross sections. Preferably, the pivot arm 22 is a telescopic and swivel hitch of the type disclosed in my pending application, U.S. Ser. No. 10/908,514 filed on May 16, 2005, which is a continuation-part application of U.S. Ser. No. 10/628,064 filed on Jul. 25, 2003, now abandoned, both of which are hereby incorporated by reference herein. The pivot arm 22 is carried for variable inclination and elevation as described below at a fixed position front pivot pin 32 and a variable position rear pivot pin 34.

Figure 6:
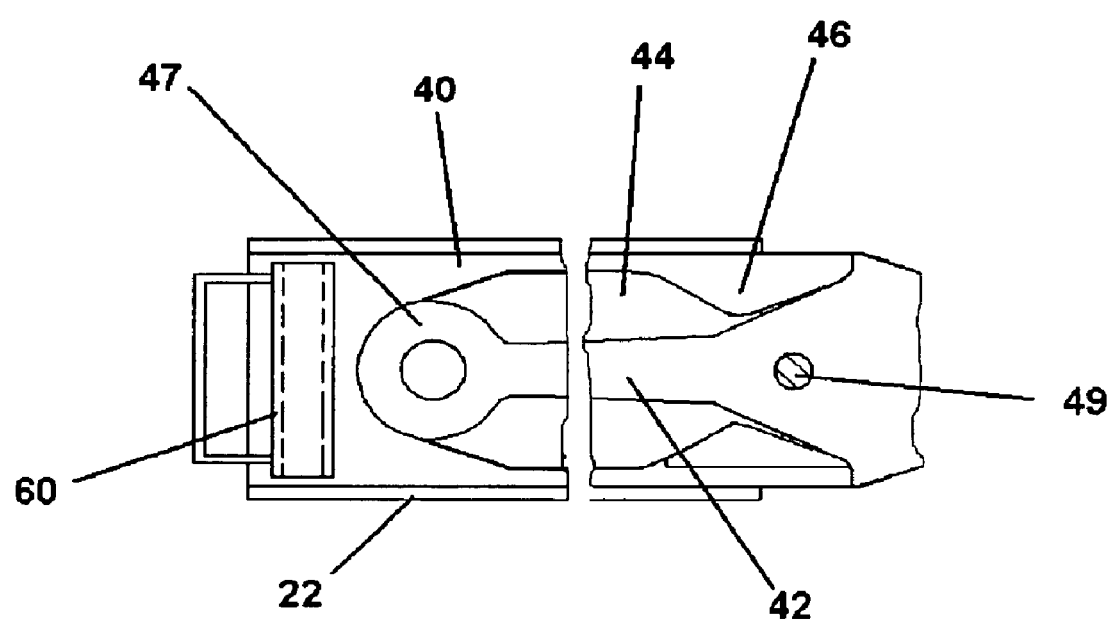
FIG. 6 is a cross sectional view taken along line 6—6 in FIG. 1.

Referring additionally to FIG. 6, the pivot arm 22 includes a housing 40 having an alignment arm 42 mounted in an internal cavity 44 frontally terminating at a restricted frontal throat 46. The arm 42 can be extended and pivoted to position the hitching eyelet 24 variably proximate to the tow hook 14 of the towing vehicle. The circular base 47 of the alignment arm 42 coacts with the walls of the cavity to provide an aligning torque upon forward or rearward movement of the towing vehicle. Upon rearward movement of the towed vehicle, the tow bar attains an aligned nested position in the cavity and a lock assembly 48 (FIG. 1) is actuated to insert a locking pin 49 in a vertical hole in the front of the alignment arm 42 for locking to the housing 40.

Figure 5:
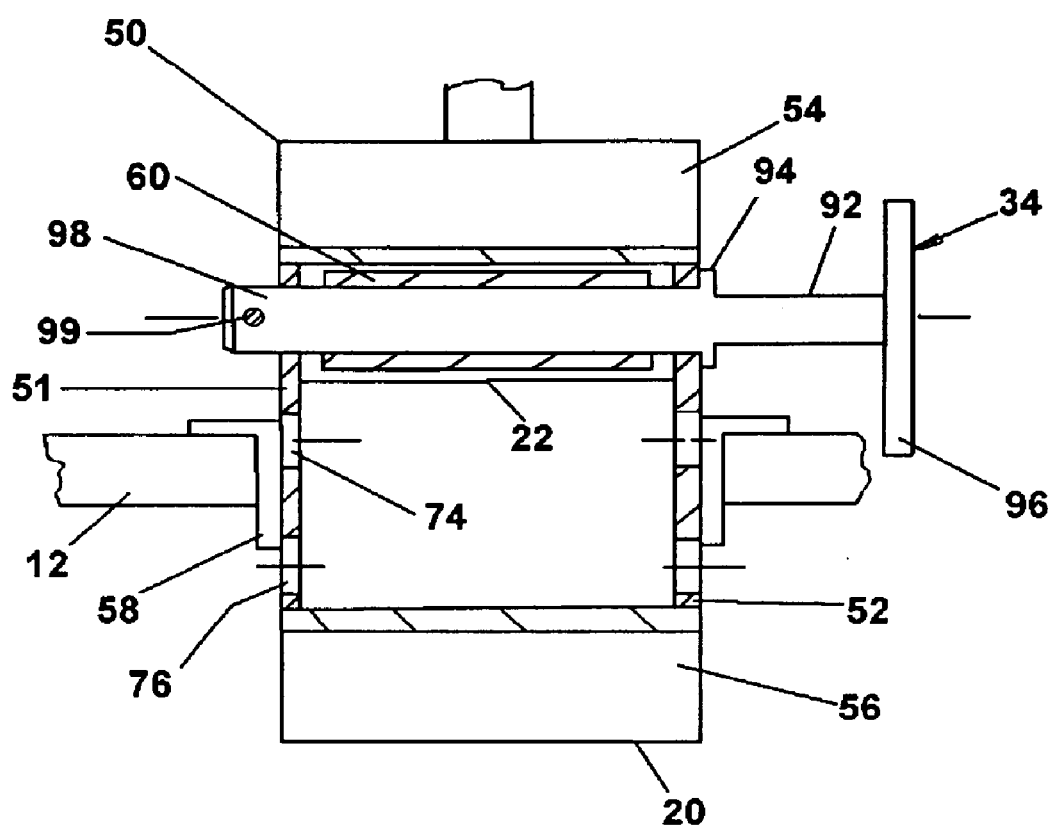
FIG. 5 is view taken along line 5—5 in FIG. 1 showing details of the pivot connections between the hitch and the mount housing.

Referring additionally to FIG. 5, the pivot support assembly 20 comprises a weldment housing 50 having a pair of parallel laterally spaced side plates 51, 52, a forwardly upwardly inclined top plate 54 and a symmetrically disposed forwardly downwardly inclined bottom plate 56. The inclination of the top and bottom plates is sufficient to allow pivoting of the arm 22 to the select inclined positions. The inner surfaces of the plates define a constant width longitudinal passage of progressively forwardly increasing height having a rear opening and front opening. The pivot arm 22 has a sliding fit with respect to the side plates 51, 52.

A pair of horizontal L-shaped mounting brackets 58 are exteriorly welded to the side plates 51, 52 and have outwardly extending flanges fixedly connected to the tongue 12 by fasteners 59. For mounting on the towing vehicle, adaptive bracketing is employed.

Figure 2:
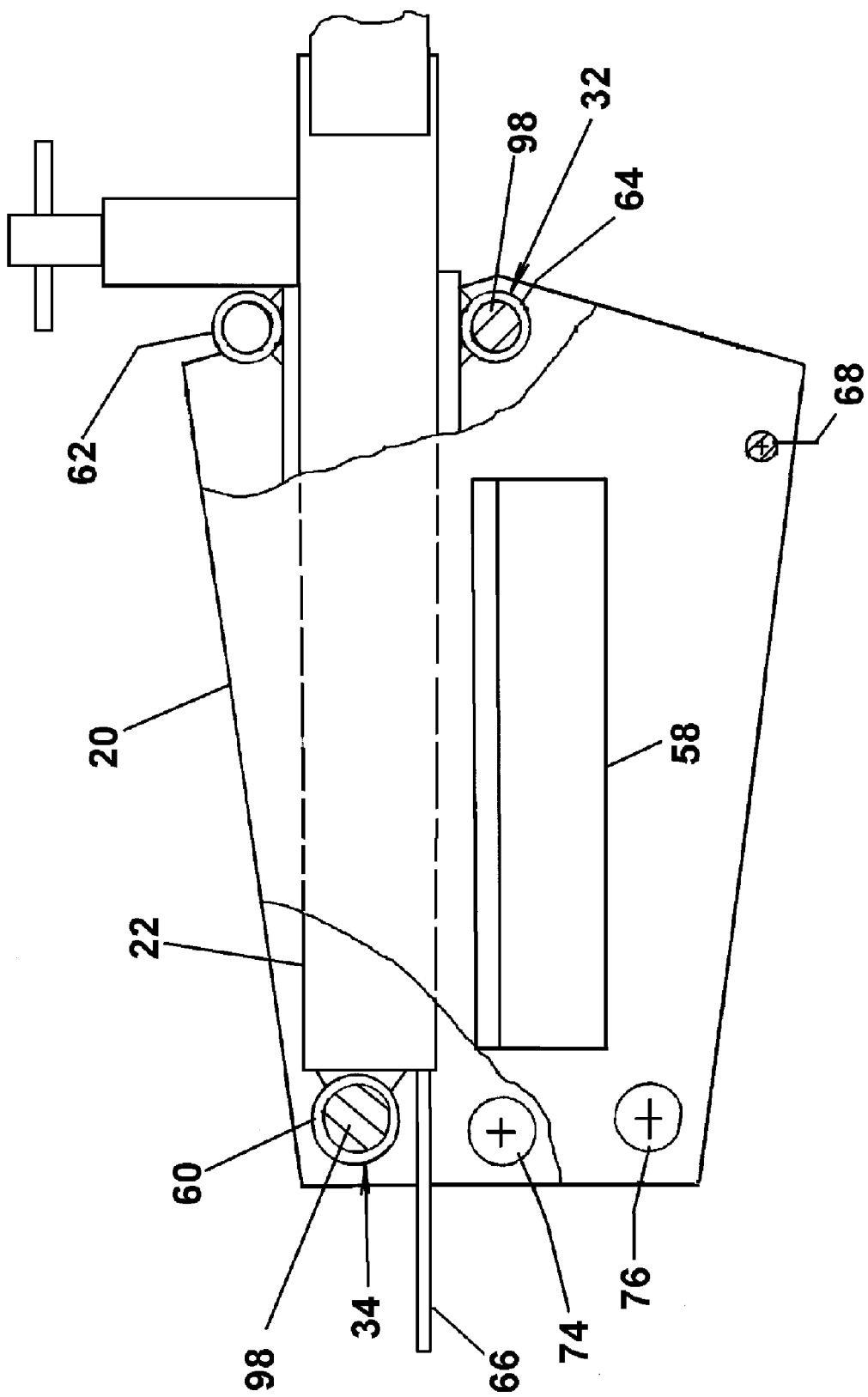
FIG. 2 is a partially sectioned side view of the mount assembly attachment connections between the hitch and the mount housing.

Referring to FIG. 2, a transverse rear pin connector or sleeve 60 having a cylindrical bore is welded at the center of the rear wall the housing 40 of the pivot arm 22. A pair of transverse front pin connectors or sleeves 62, 64 having cylindrical bores are welded in vertical alignment to the top and bottom walls of the housing 40 rearwardly of the lock assembly 48. The distance or radius between the axes of the rear pin sleeve 60 and each of the front pin sleeves 62, 64 are equal. While shown as cylindrical sleeves, the cylindrical bores may be formed in other structural configurations such a rectangular blocks.

To assist in moving the pivot arm between the various positions, front and rear lift devices are provided. For pivoting about the front pin connection 32 wherein the weight is substantially balanced, a U-shaped lifting handle 66 is attached to the rear wall of the housing 40 and projects rearwardly therebeyond for facilitating manual rearward repositioning the pivot arm 22 with respect to the housing 20 as described below. For pivoting about the rear pin connection 34 wherein the weight is cantilevered, a lifting lever 67 at the outer side of the housing 20 is pivotally connected to a shaft 68 rotatably supported on the side plates 51, 52 adjacent the base plate 56. A lifting cam 69 disposed under the pivot arm 22 is connected to the shaft 68. Upon rotation of the lever 67, the cam 69 engages the base of the pivot arm 22 to mechanically effect raising and lowering the front of the pivot arm to differing positions enabling establishing the pin connection at the moved location.

Figure 7:
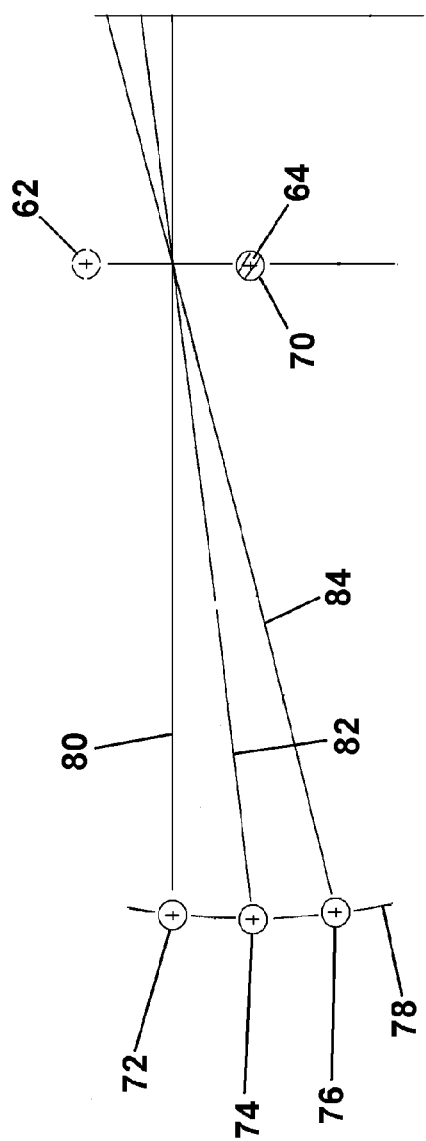
FIGS. 7 and 8 are schematic drawings showing the range of inclination and elevation orientations of the mount assembly.
Figure 8:
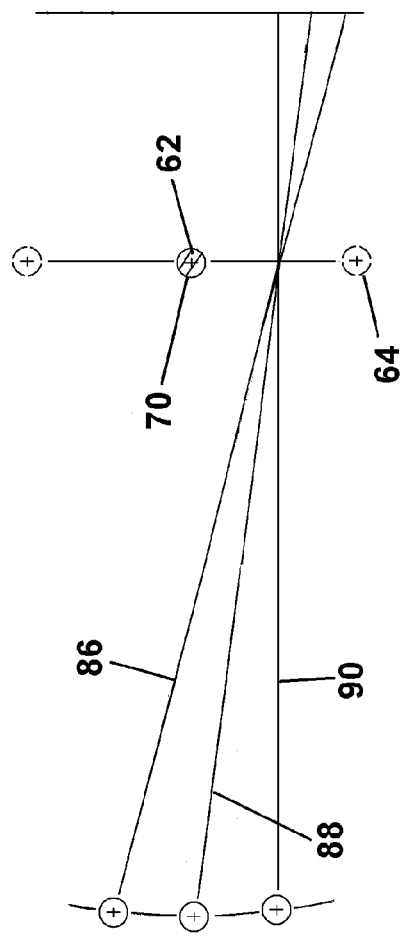

Referring to FIG. 9, a central front mounting hole 70 having a horizontal transverse axis is formed in the side plates 50, 52 at the front of the housing 40 on the vertical center line thereof. A vertical series of rear mounting holes 72, 74, 76 having horizontal transverse axes, are formed at the rear of the ho using 40 between the side plates 51, 52 on an arc with respect to the axis of the front mounting hole at a radius the same as between the rear sleeve 60 and the front sleeves 62, 64. By selective disposition of the mounting pins 32 and 34 at select front and rear mounting holes 70, the hitch may be mounted on the housing at varying elevations and angularities. The adjustment capabilities are schematically shown in FIGS. 7 and 8. Therein, the rear mounting holes 72, 74, 76 are disposed on a constant radius arc 78 with respect to the front mounting hole 70. In the upper level of adjustment for the housing as shown in FIG. 7 and in the solid lines of FIG. 1, the front pin 34 is mounted on the lower pin sleeve 64 and by selective assembly of the rear pin 32 at the rear mounting holes 72, 74, and 76 the housing 40 of the pivot arm 22 is inclined along lines 80, 82 and 84. In the lower level of adjustment as shown in FIG. 8 and the dashed lines of FIG. 1, the front mounting pin connection 32 is mounted on the upper pin sleeve 62 and by selective assembly of the rear pin 32 at the rear mounting holes 72, 74, and 76 the housing of the pivot arm is inclined along lines 86, 88 and 90. For the three hole rear pattern illustrated, it will be appreciated that six distinct vertical positions for the tow eyelet are provided. It will further be appreciated that increasing the number of rear mounting holes along the arc will result in further vertical positions. Further, the locations of the sleeve and hole patterns may be reversed.

Figure 3:
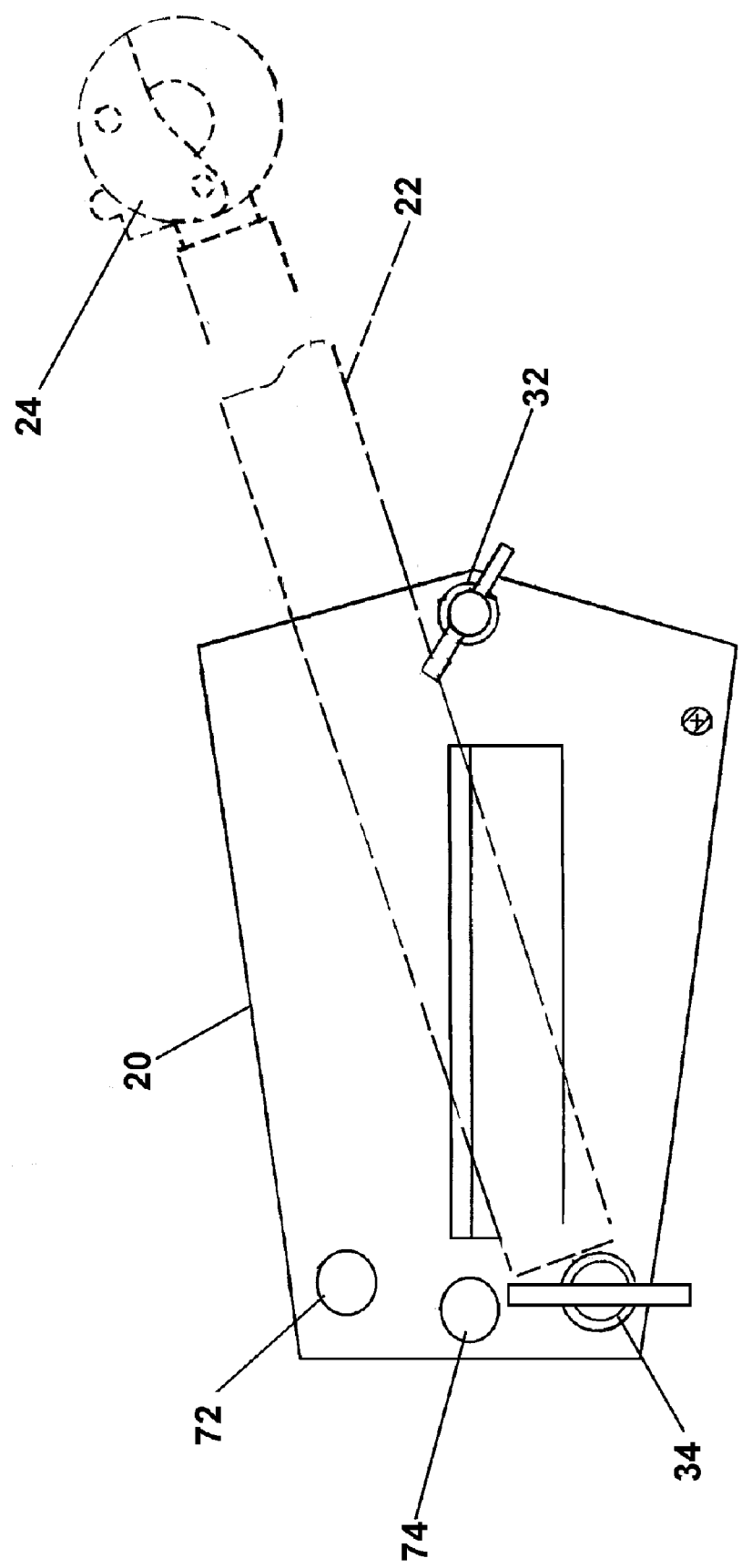
FIG. 3 is a side elevational view of the mount assembly of FIG. 1 showing the hitch in the upwardly inclined position.
Figure 4:
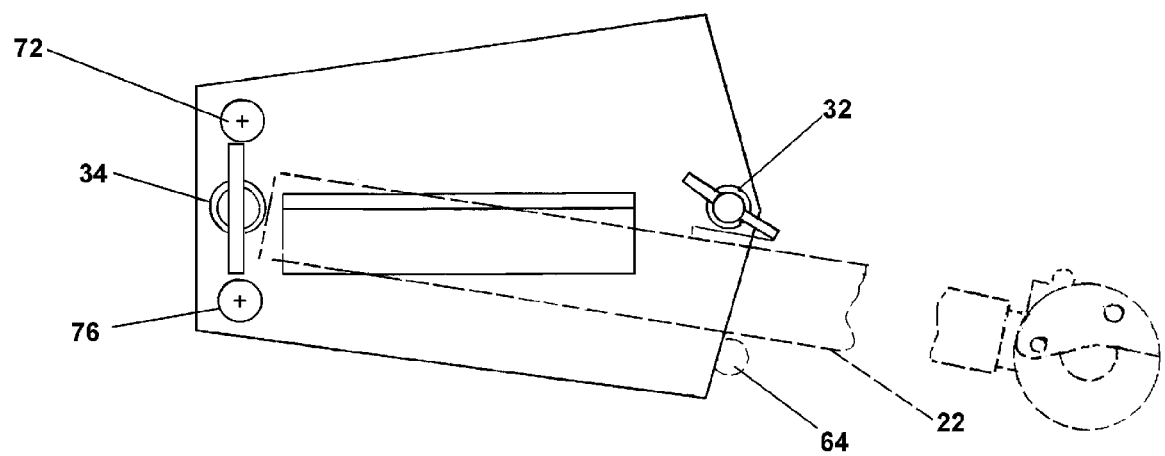
FIG. 4 is a side elevational view of the mount assembly of FIG. 1 showing the hitch in the downwardly inclined position.

Thus, as shown in FIG. 1, an upper level mounting position of the hitch as shown by solid lines may be established by pin connections at the top rear hole 72 and at the central front hole 70 and at the lower sleeve 64. A lower level mounting position of the hitch shown by dashed lines may be established by pin connections at the lower rear hole and at the center front hole and upper sleeve 60. As shown in FIG. 3, an upwardly inclined position of the hitch may be provided by a rear pin connection 34 at a lower rear hole 76 and a front pin connection 32 at the front upper sleeve 62 and upper sleeve 62. As shown in FIG. 4, a downwardly inclined position may be provided by a rear pin connection 34 at the center rear hole 74 and the front upper sleeve 62. It will be appreciate that additional positions may be effected by selective positioning of the rear pin in any of the illustrated locations, and selective positioning of the front pin connection at the front holes at either the top or bottom sleeves.

Referring to FIG. 5, the front and rear pin connections are provided by similar mounting pin connections and are representatively described with reference to the rear mounting pin connection 34. Therein, the mounting pin assembly includes a cylindrical head section 92 having an enlarged stop collar 94 that outwardly terminates with a transverse handle 96, and a cylindrical shank 98 having a diameter providing a sliding fit with the associated holes and sleeve. As illustrated, in assembly the collar engages the side plate, and the shank terminates with a cross hole for receiving a cross lock pin 99 to prevent removal.

The front and rear series of cross holes are configured such that for each rear pin position, at least one of the front sleeves is alignable with the front cross holes. This allows a single operator to shift the hitch assembly between positions. For instance, if it is desired to shift from the upper to lower positions of FIG. 1, the lever 67 is actuated such that the cam 69 supports the arm 22 and the front pin residing in the lower sleeve is removed. Thereafter the lever 67 is raised lowering the arm 22 until the upper sleeve is aligned with the center front hole, and the front pin is reinserted. Thereafter, the rear pin is removed, and holding the handle 66, the housing is rotated to align the rear sleeve with the bottom hole and the rear pin reinserted. The other illustrated positions are effected by similar selective, sequential rotation. The range of orientations may be increased or modified by layout of additional holes to achieve the foregoing selective assembly to position the hitch eyelet 34 at the optimum location for interconnecting the towed and towing vehicles.

For example, a pivoting hitch mount assembly in accordance with the above was tested using a single front connection location and two rear connections corresponding to rear connections 72, 76 thus providing two inclinations and two elevations. At a radius 78 of 14 inches, a vertical spacing of 6 inches for the rear connections, a 6 inch spacing on the front connectors, and a pivot arm length of 28 inches, the mount assembly provided a hitch eyelet elevation range of 18 inches. The resulting assembled conditions provided a fixed tow arm meeting towing military specifications.

Having thus described a presently preferred embodiment of the present invention, it will now be appreciated that the objects of the invention have been fully achieved, and it will be understood by those skilled in the art that many changes in construction and widely differing embodiments and appli- cations of the invention will suggest themselves without departing from the sprit and scope of the present invention. The disclosures and description herein are intended to be illustrative and are not in any sense limiting of the invention, which is defined solely in accordance with the following claim.

What is claimed is:

1. A hitch assembly for connecting first and second hitch components at differing elevations between towing and towed vehicles, said hitch assembly comprising: an elongated pivot arm assembly having front and rear ends, wherein said first hitch component is connected at said front end for connection with the second hitch component mounted on one of the vehicles; a support assembly for connection with the other of the vehicles; upper and lower front apertures transversely formed and vertically spaced at top and bottom portions on a center portion of said pivot arm assembly; a transverse rear aperture on a rear portion of said pivot arm assembly wherein said front apertures are spaced at a common distance from said rear aperture; a frontal aperture transversely formed in a front portion of said support assembly; a plurality of rearward apertures transversely formed in a rear portion of said support assembly wherein said frontal aperture and said rearward apertures are spaced at said common distance whereby either of said front apertures on said pivot arm assembly may be aligned with said frontal aperture in said support assembly while said rear aperture is selectively aligned with one of said rearward apertures in said support assembly in a selected mounting position; a front connector member extending through said frontal aperture of said support assembly and one of said front apertures of said pivot arm assembly to provide a fixed front connection; and a second connector member extending through one of said rearward apertures of said support assembly and said rear aperture of said pivot arm assembly to provide a fixed rear connection, whereby selective inclination and elevation of the first hitch component may be provided by selective assembly of said connector members and said apertures to provide varying inclinations and elevations of said pivot arm assembly and said first hitch component.

2. The hitch assembly as recited in claim 1 wherein said rear aperture is vertically centered with respect to said front apertures.

3. The hitch assembly as recited in claim 2 wherein said plurality of rearward apertures includes an upper rearward aperture for establishing an upper level position for said pivot arm assembly when said rear connection is thereat and said front connection is at said lower front aperture of said pivot arm assembly, and further includes a lower rearward aperture for establishing a lower level position for said pivot arm assembly when said rear connection is thereat and said front connection is at said upper front aperture of said pivot arm assembly.

4. The hitch assembly as recited in claim 3 wherein a downwardly inclined position of said pivot arm assembly is provided when said rear connection is at said upper rearward apertures of said support assembly and said front connection is at said upper front aperture of said pivot arm assembly, and wherein an upwardly inclined position of said pivot arm assembly is provided when said rear connection is at said lower rearward apertures of said support assembly and said front connection is at said lower front aperture of said pivot arm assembly.

5. The hitch assembly as recited in claim 4 including a rearward extending lifting member attached at the rear end of said pivot arm assembly for raising and lowering the rear portion of said pivot arm assembly about said front connection in movement between said positions.

6. The hitch assembly as recited in claim 5 including a lever actuated cam on said support assembly engaging said pivot arm assembly for assisting movement thereof about said rear connection between said positions.

7. The hitch assembly as recited in claim 1 wherein said pivot arm assembly includes a telescopic and swiveling arm assembly to which said first hitch component is connected at said front end.

8. The hitch assembly as recited in claim 1 wherein said support assembly includes spaced vertical support members on opposed sides of said pivot arm assembly.

9. The hitch assembly as recited in claim 1 wherein said apertures are cylindrical and said connector members includes cylindrical ends slidably extending through said apertures for establishing said connections.

10. The hitch assembly as recited in claim 1 wherein said support assembly is mounted on a towed vehicle.

11. The hitch assembly as recited in claim 1 wherein said support assembly is mounted on a towing vehicle.

* * * * *